(12) United States Patent
Ghannam et al.

(10) Patent No.: US 12,469,481 B2
(45) Date of Patent: Nov. 11, 2025

(54) VEHICLE SOUND ORDINANCE CONTROL AND METHOD

(71) Applicant: Ford Global Technologies, LLC, Dearborn, MI (US)

(72) Inventors: Mahmoud Yousef Ghannam, Canton, MI (US); Muhannad Anwar Hamdan, Canton, MI (US); Christian Wegner, Clawson, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 18/515,517

(22) Filed: Nov. 21, 2023

(65) Prior Publication Data

US 2025/0166598 A1    May 22, 2025

(51) Int. Cl.
*G10K 11/16* (2006.01)
*G10K 11/178* (2006.01)

(52) U.S. Cl.
CPC .. *G10K 11/17883* (2018.01); *G10K 11/17827* (2018.01); *G10K 2210/128* (2013.01)

(58) Field of Classification Search
CPC ....... G10K 2210/128; G10K 11/17827; G10K 11/17883
USPC ................................................ 381/71.4, 71.1
See application file for complete search history.

(56) References Cited

U.S. PATENT DOCUMENTS

| 6,040,766 | A | 3/2000 | Lubke et al. |
| 8,963,698 | B2 | 2/2015 | Grossman |
| 9,156,474 | B2 | 10/2015 | Holub et al. |
| 10,755,691 | B1 * | 8/2020 | Herman ........... G10K 11/17853 |
| 2021/0086652 | A1 | 3/2021 | Follen et al. |

FOREIGN PATENT DOCUMENTS

| CN | 103042971 A | 4/2013 |
| CN | 111090409 A | 5/2020 |
| GB | 2523354 A | 8/2015 |
| JP | H10208194 A | 8/1998 |
| JP | 2004218583 A | 8/2004 |
| SE | 1750673 A1 | 12/2018 |
| WO | 2015125151 A2 | 8/2015 |
| WO | 2019121520 A1 | 6/2019 |

* cited by examiner

*Primary Examiner* — Ammar T Hamid
(74) *Attorney, Agent, or Firm* — Frank Lollo; Price Heneveld LLP

(57) ABSTRACT

A vehicle with sound monitoring, having a cabin interior configured to transport one or more occupants, an interior microphone located in the cabin interior for detecting interior sound, a navigation device for detecting a geographic location of the vehicle, and a controller to determine sound ordinance rules with a sound limit based on the detected location, the controller further determining an exterior sound level based on the detected interior sound with the interior microphone, wherein the controller further generates an output indicative of the detected exterior sound level relative to the sound limit.

20 Claims, 4 Drawing Sheets

VEHICLE SOUND ORDINANCE CONTROL AND METHOD

FIELD OF THE DISCLOSURE

The present disclosure generally relates to vehicle related sound monitoring, and more particularly relates to monitoring and providing notification or controlling sound on a vehicle in accordance with sound requirements.

BACKGROUND OF THE DISCLOSURE

Motor vehicles typically emit various sounds such as sounds that may be produced by the engine in various operating modes, exhaust, tire friction, an audio music/radio system, a horn, commercial unit sounds, and other sound sources. Vehicles may travel in geographic regions that have local sound ordinances or other rules or recommendations. It would be desirable to provide for the monitoring and notification or control of sound in compliance with sound rules while traveling in local geographic regions.

SUMMARY OF THE DISCLOSURE

According to a first aspect of the present disclosure, a sound monitoring system for a vehicle includes a cabin interior configured to transport one or more occupants, an interior microphone located in the cabin interior for detecting interior sound, a navigation device for detecting a geographic location of the vehicle, and a controller configured to determine a sound level limit based on the detected location, the controller further determining an exterior sound level based on the detected interior sound, wherein the controller further generates an output indicative of the determined exterior sound level relative to the sound level limit.

Embodiments of the first aspect of the present disclosure can include any one or a combination of the following features:
  the controller generates a notification when the determined exterior sound level is not within the sound level limit;
  the controller controls one or more devices to control the exterior sound level based on the comparison;
  the controller controls the one or more devices to alter the exterior sound level when the determined exterior sound is not within the sound level limits;
  the one or more devices include at least one of a window and a moonroof;
  the one or more devices include at least one of an audio device and a horn;
  the one or more devices includes a motor of the vehicle or a sound generator for electric vehicles;
  the sound level limit is determined by a sound ordinance;
  the interior microphone is configured to receive voice commands from a driver of the vehicle or is used in an active noise cancellation system;
  the sound transfer function estimates the exterior sound; and
  the sound transfer function determines the external sound level based on the detected interior sound and the state of one or more windows or moonroof.

According to a second aspect of the present disclosure, a method of monitoring sound of a motor vehicle includes detecting an interior sound level with an internal microphone located in a cabin interior of the motor vehicle, determining an exterior sound outside the cabin interior based on the detected interior sound, determining a geographic location of the motor vehicle, determining one or more sound limits for the determined geographic location, comparing the determined exterior sound with the one or more sound limits, and generating an output indicative of the comparison of the exterior sound to the one or more sound limits.

Embodiments of the second aspect of the present disclosure can include any one or a combination of the following features:
  the step of notifying an occupant of the vehicle when the exterior sound level is not compliant with the one or more sound limits;
  the step of controlling one or more devices on the vehicle when the exterior sound level is not compliant to the one or more sound limits to adjust the external sound;
  the one or more devices includes at least one of the vehicle window and moonroof;
  the at least one device includes a horn or audio device on the vehicle;
  the one or more devices includes a motor of the vehicle or artificial sound generator for electric vehicles;
  the one or more sound limits is based on a sound ordinance;
  a sound transfer function estimates the exterior sound; and
  the sound transfer function determines the external sound level based on the detected interior sound and the state of one or more windows or moonroof.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
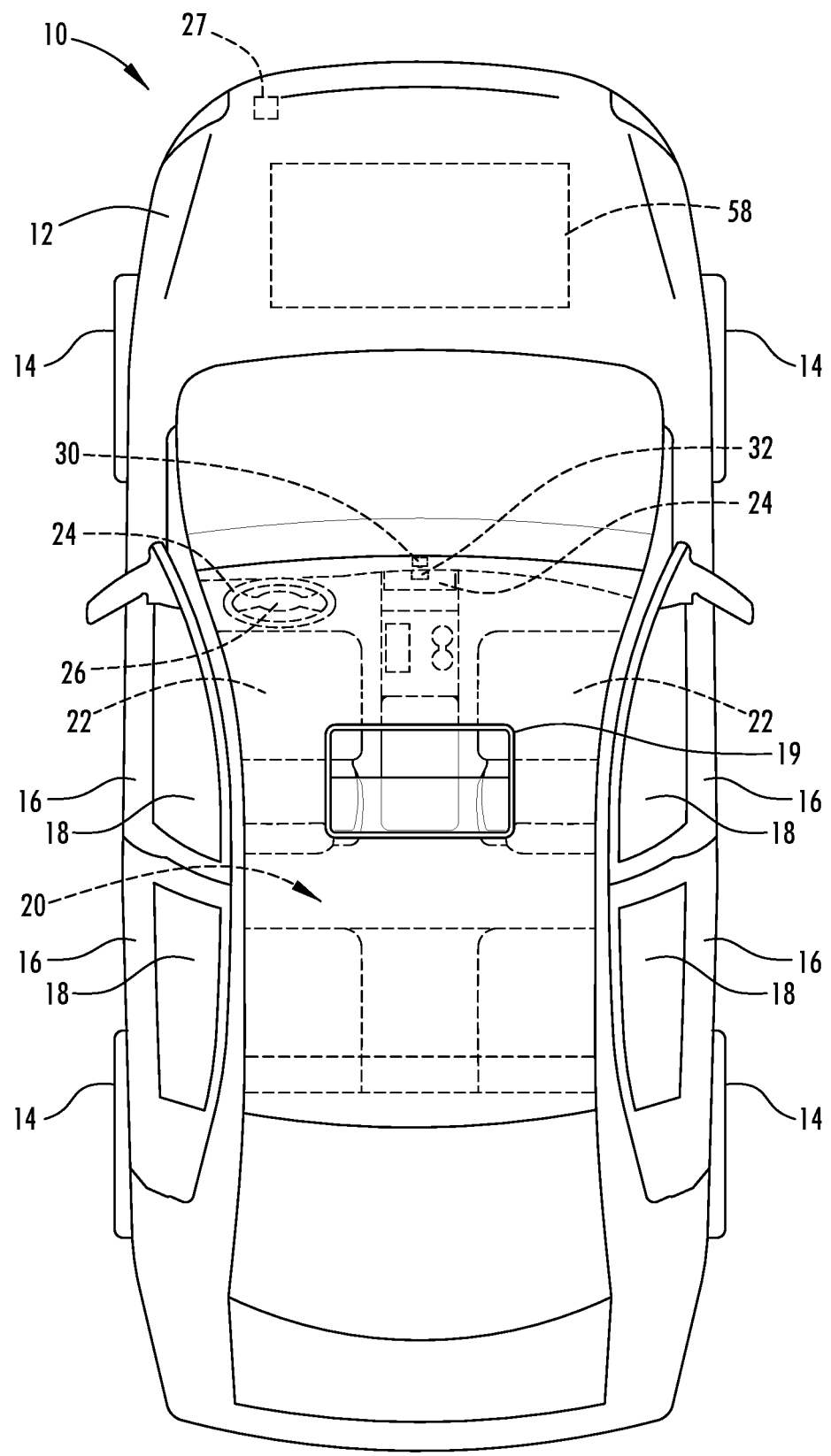
FIG. 1 is a top schematic view of a motor vehicle equipped with a sound monitoring and control system, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower." "right." "left." "rear," "front." "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a motor vehicle sound monitoring and control system and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an." mean "at least one," and should not be limited to "only one" unless explicitly indicated to the contrary. Thus, for example, reference to "a component" includes embodiments having two or more such components unless the context clearly indicates otherwise.

Figure 2:
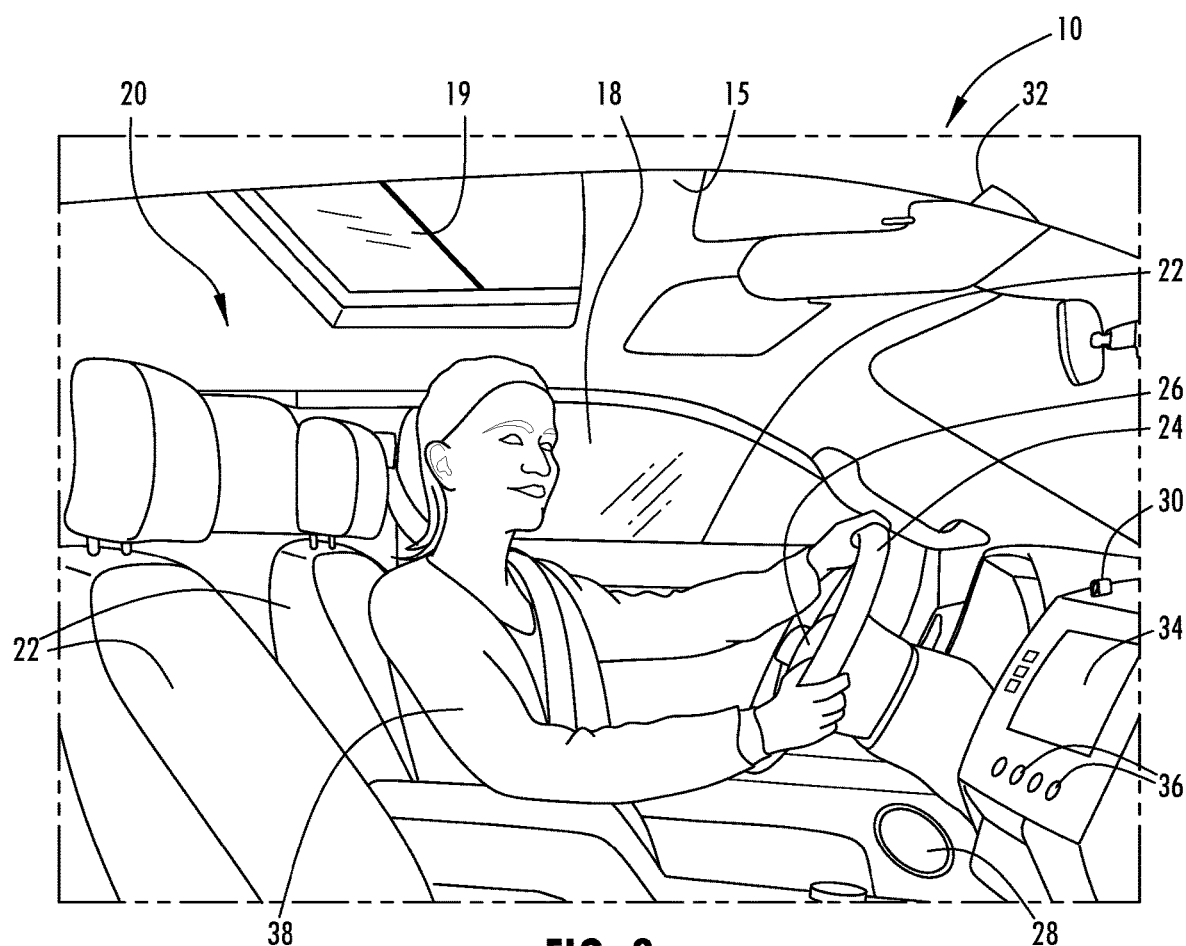
FIG. 2 is a side perspective view of a portion of the cabin interior of the motor vehicle shown in FIG. 1.

Referring to FIGS. 1 and 2, an automotive or motor vehicle 10 is generally illustrated in the form of a passenger vehicle having a sound monitoring and control system and method, according to one embodiment. The motor vehicle 10 has a body 12 that defines a cabin interior 20 and is generally supported on a plurality of wheel and tire assemblies 14 that connect to the axles of the motor vehicle 10. The body 12 includes a plurality of passenger doors 16 shown with front and rear doors located on each of the opposite lateral sides of the motor vehicle 10. Each of the passenger doors 16 may include a powered window 18 which may be powered to move between an upper closed position and a lower open position and intermediate positions between the open and closed positions. The body 12 may also include a roof mounted window referred to as a powered moonroof 19 shown located overhead in roof 15 of the body 12.

The cabin interior 20 defines a passenger compartment that includes a plurality of seat assemblies 22 which, in the example shown, includes a pair of front seat assemblies 22 separated by a space containing a center console and a rear row of seating that may include a plurality of seat assemblies. It should be appreciated that the motor vehicle 10 may include more or less seating assemblies and various other accommodations and accessories, according to other examples.

The cabin interior 20 is configured to accommodate a driver and one or more passengers as occupants in the motor vehicle 10. Seated forward of a driver's seat configured to receive a driver is a steering wheel 24 which may include an audible horn switch 26. The horn switch 26 may allow generation of an elevated level of sound from the horn set at a high decibel level upon activation of horn switch 26 by the driver of the motor vehicle 10. The motor vehicle 10 is also configured to include one or more microphones including an interior microphone 30 which is located within the cabin interior 20. The interior microphone 30 may be located on a dashboard, in a rearview mirror assembly or mount therefor, in the roof 15, or elsewhere in the cabin interior 20 of the motor vehicle 10 in a position suitable to detect sound within the cabin interior 20 of the motor vehicle 10. The interior microphone 30 may be a microphone that is positioned and configured to receive audible spoken voice commands by a driver or one of the passengers of the motor vehicle 10, according to one example. For a microphone intended to receive audible sound from a driver, the interior microphone 30 may detect commands spoken by the driver such as input commands with instructions to perform one or more functions or may be used in an active noise cancellation system. The interior microphone 30 is configured to detect sound and to determine a sound level of the sound detected within the cabin interior 20. The motor vehicle 10 is further configured to estimate an exterior sound in the immediate environment outside the motor vehicle 10 based on the detected interior sound. The outside sound is estimated proximate the exterior of the motor vehicle 10 by using a transfer function. The transfer function may estimate the exterior sound based on known sound transmission properties of the vehicle which may vary depending on the sound insulation and the state of the windows and moonroof. As a result, the interior microphone 30 may be utilized to detect an outside sound level. It should be appreciated that more than one interior microphone may be used and that one or more exterior microphones may be used.

The motor vehicle 10 is also equipped with a human machine interface (HMI) in the form of a display 34 which is generally shown located forward of and between the two front row seat assemblies 22. The display 34 may include a touchscreen display for receiving user inputs and providing a display output. The display 34 may be operatively coupled to or integrated into a module that includes audio controls 36 that may be used to control audio sound output by an audio sound system having one or more audio speakers 28. Other HMIs such as switches on the steering wheel, for example, may be employed. It should be appreciated that the cabin interior 20 may be equipped with a plurality of audio speakers for outputting audio sound generated by one or more audio devices.

The motor vehicle 10 is equipped with a navigation location determining device in the form of a global positioning system (GPS) receiver 32. The GPS receiver 32 may be located within or on the body 12 of the motor vehicle 10 such as on the roof 15, for example. The GPS receiver 32 receives GPS signals from a plurality of satellites and may determine the geographic location of the motor vehicle 10. In addition, the GPS signals may provide time of day and date, i.e., time of year, data. The determined geographic location and time and date information may be used to determine appropriate sound level limits pursuant to local rules or ordinances.

Figure 3:
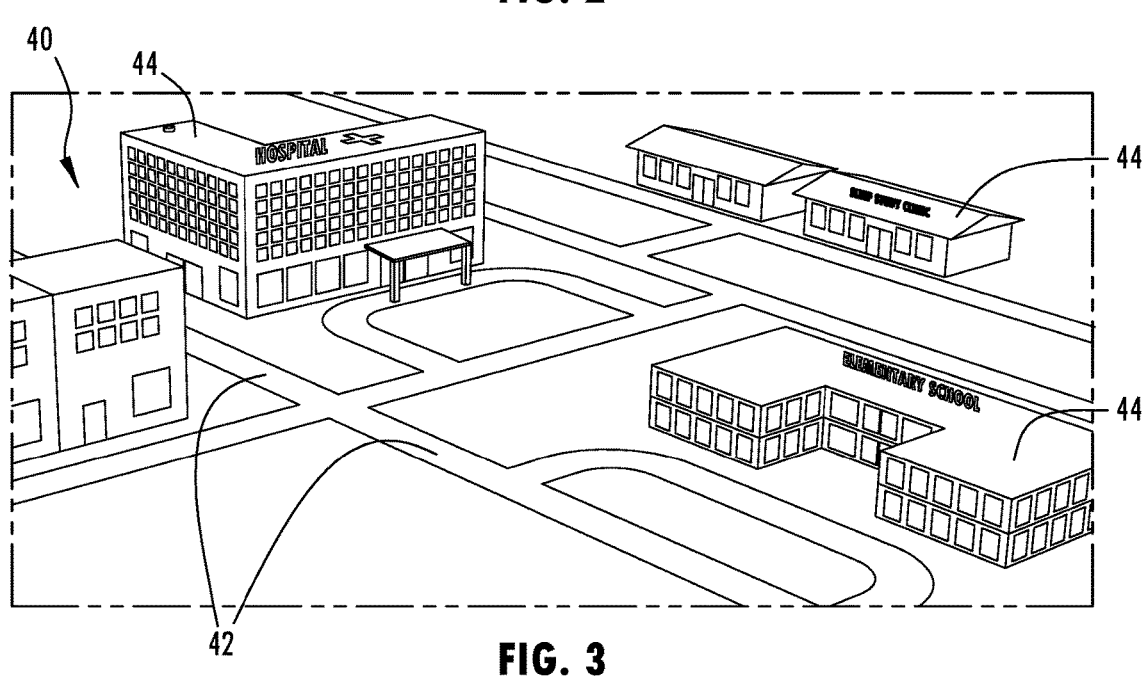
FIG. 3 is an elevated perspective view of a geographic region, having roadways and buildings subject to sound ordinances, according to one example.

Referring to FIG. 3, one example of a geographic region 40 is illustrated having a roadway 42 upon which the motor vehicle 10 may travel. The geographic region 40 also includes a plurality of buildings 44. The buildings 44 may include specialty buildings such as a hospital, a school, a housing facility, a specialty clinic, and other types of buildings that may desire to maintain sound levels below a certain level. The geographic region 40 may be encumbered by sound level rules or regulations issued pursuant to a local ordinance, for example. Local ordinances may mandate maximum sound levels for a local city, county, state, or other geographic region and may require limitations on the maximum allowed sound level which may vary depending upon the time of year and time of day. For example, sound level rules or regulations may be mandated in close proximity to a hospital or a school or a specialty clinic. Local ordinances or other rules may also impose a minimum sound level such as, for example, electric vehicles which may not otherwise produce engine noise.

To accommodate the sound rules or ordinances, the motor vehicle 10 is equipped with a vehicle sound monitoring and control system 50 and method. The sound monitoring system 50 of the motor vehicle 10 detects the sound level in the interior of the cabin in the motor vehicle 10 and determines an estimated sound level in the environment outside proximate to the motor vehicle 10. The motor vehicle 10 also acquires and stores or determines any applicable sound regulation ordinances or rules that are in effect at that time within the geographic region where the motor vehicle 10 is located. The sound monitoring control system and method may determine the location of the motor vehicle 10, and hence the geographic region of interest and look up and determine the sound regulation ordinances and rules in effect at that time in the corresponding geographic region. It should be appreciated that sound regulation ordinances and rules may be stored in memory or may be downloaded as the vehicle travels from one geographic region to another geographic region. In response to detecting an excessive sound level above the acceptable sound ordinance or other regulation or rules, the motor vehicle 10 may generate an output to notify the driver and other occupants of the motor vehicle 10 of the inadequate or excessive sound level. The driver of the motor vehicle 10 may then control one or more functions or features on the motor vehicle 10 to control and alter the sound level to an acceptable level compliant with the sound limit. For example, the motor vehicle 10 may automatically take action to control one or more devices or functions on the motor vehicle 10 to reduce the sound level to a level that is below the sound limit in the applicable rules or regulations. For example, the motor vehicle 10 may automatically reduce the sound generated by an audio system or reduce the engine sound output or close one or more powered windows or the powered moonroof on the motor vehicle 10 to reduce the audio system sound level heard outside the vehicle.

Figure 4:
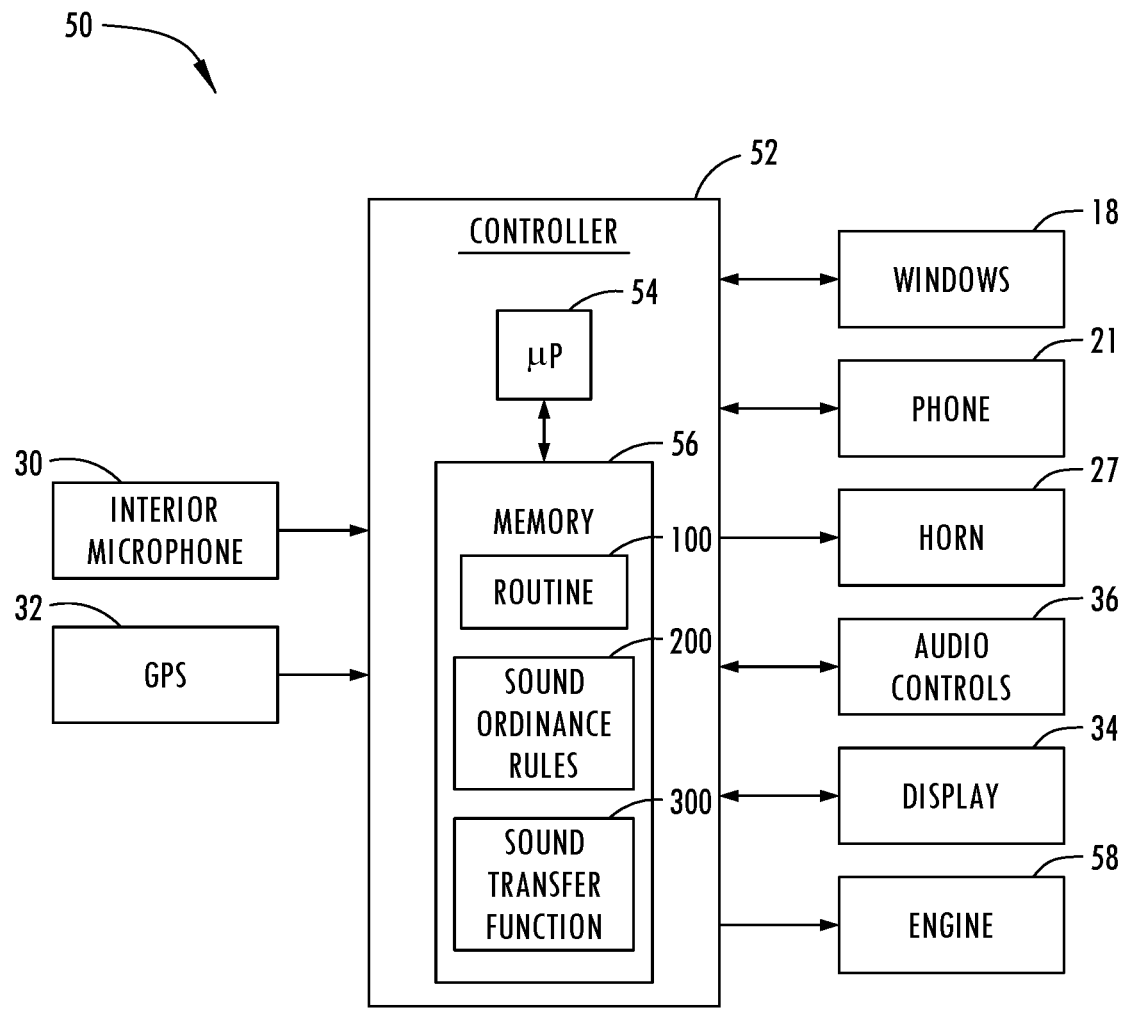
FIG. 4 is a block diagram of the sound monitoring and control system, according to one example.

The motor vehicle sound monitoring and control system 50 is illustrated having a controller in FIG. 4. The controller 52 may include a microprocessor 54 and memory 56. It should be appreciated that the controller 52 may employ a shared or dedicated controller and may include other analog and/or digital circuitry. Stored in memory 56 and executed by the microprocessor 54 is a control routine 100 for executing the method and one or more sound ordinance rules 200 and a sound transfer function 300. The sound ordinance rules 100 may be initially stored in memory ahead of time or may be downloaded to the motor vehicle 10 periodically or continuously and may be received from communication towers and satellites such as cellular towers and from other vehicles via vehicle-to-vehicle communication. The sound transfer function 300 may include an algorithm that estimates the external sound in the environment proximate the exterior of the motor vehicle 10 based on the detected interior sound and other parameters such as whether one or more windows or a moonroof is open in the motor vehicle 10. The algorithm may include known sound insulation characters of the vehicle gathered during testing.

The controller 52 receives and processes inputs including the audio input signal detected by the interior microphone 30 and the navigation data including the location, date, and time data from the GPS receiver 32. The controller 52 processes the detected interior sound with the transfer function to estimate an exterior sound in the exterior environment proximate to the motor vehicle 10. The controller 52 processes the interior sound detected by the interior microphone 30 and the navigation data and generates one or more outputs which may include notifications to the display 34 indicative of the compliance of the sound level with the local ordinances or rules for that geographic region. In addition, the controller 52 may output the notifications and other data to display 34 and/or a portable device such as a phone 21. The controller 52 may control devices such as the audio controls 36 to control the audio output via the audio speakers 28. The controller 52 may further control sound generating devices such as the horn 27 which is activated by the horn switch 26 to reduce the sound emitted from the horn 27 when activated to prevent the horn 27 from exceeding the audible sound limits. The controller 52 may further control the powered windows 18 so as to control the sound level in the exterior environment. The controller 52 may further control the moonroof 19 to further control the sound levels in the exterior environment. Further, the controller 52 may control the vehicle engine 58 to prevent the engine from generating excessive sound or causing the tires to squeal to the extent that the sound would exceed the sound limits. The controller 52 may also control exterior sound generators on an electric vehicle to increase the exterior sound, particularly when ambient sounds are excessive.

Figure 5:
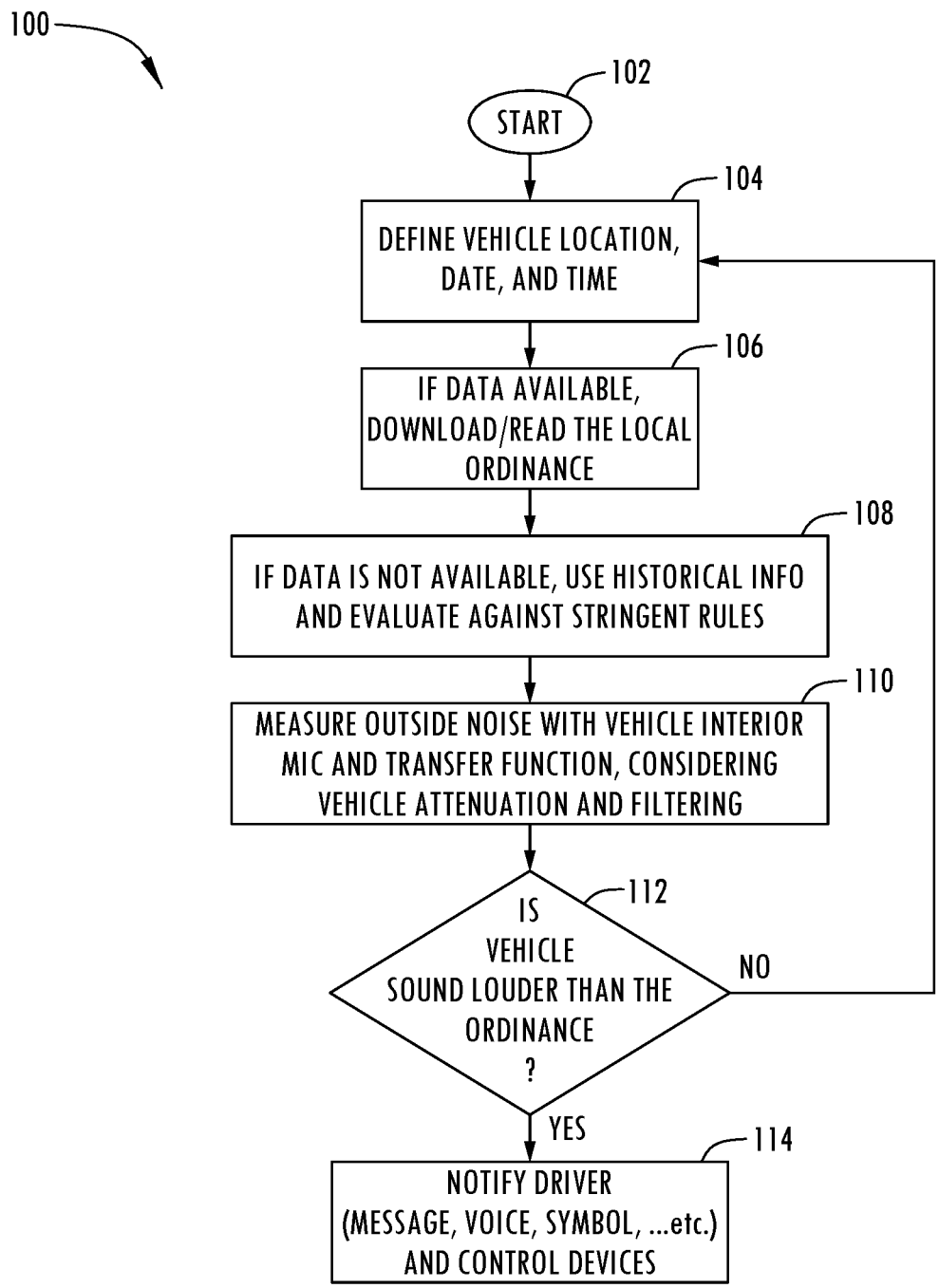
FIG. 5 is a flow diagram illustrating a routine for detecting sound and notifying a driver of excessive sound pursuant to a local sound ordinance, according to one example.

Referring to FIG. 5, the control routine 100 or method is illustrated, according to one example. Control routine 100 begins at step 102 and proceeds to step 104 to detect the vehicle location, date, and time of day. This data may be provided from one or more devices such as a radio, a cellphone, or a navigation device such as a GPS receiver. Routine 100 then proceeds to step 106 where, if data is available, routine 100 downloads or reads the local ordinance sound data for the sound limits. Next, at step 108, if data is not available, routine 100 uses historical information and evaluates against stringent sound rules. Next, at step 110, routine 100 measures the outside sound with the vehicle interior microphone and a transfer function to essentially estimate the outside sound, considering the vehicle attenuation and filtering. Control routine 100 then proceeds to decision step 112 to determine if the vehicle estimated exterior sound is louder than the ordinance sound limit and, if not, returns to step 104. If the vehicle estimated exterior sound is louder than the ordinance limit permits, control routine 100 then proceeds to step 114 to notify the driver such as to provide an alphanumeric message, a voice message, or a symbol, etc. and may further provide control to control one or more devices or vehicle functions to reduce the sound emitted by the motor vehicle 10.

Accordingly, the motor vehicle sound monitoring and control system 50 and method advantageously utilizes an interior microphone 30 in the cabin interior 20 of the motor vehicle 10 to determine and estimate the exterior sound so as to monitor the sound level and determine if the sound is compliant with local ordinance rules or regulations. The control system 50 and method further advantageously may notify the driver of the non-compliant sound and may control one or more devices on the motor vehicle 10 to adjust the sound to a level to meet the regulated sound level.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle having sound monitoring, the vehicle comprising:
    a cabin interior configured to transport one or more occupants;
    an interior microphone located in the cabin interior for detecting interior sound;
    a navigation device for detecting a geographic location of the vehicle; and
    a controller configured to determine a sound level limit based on the detected location, the controller further determining an exterior sound level based on the detected interior sound, wherein the controller further generates an output indicative of the determined exterior sound level relative to the sound level limit.

2. The vehicle of claim 1, wherein the controller further generates a notification when the determined exterior sound level is not within the sound level limit.

3. The vehicle of claim 1, wherein the controller further controls one or more devices to control the exterior sound level based on the comparison.

4. The vehicle of claim 3, wherein the controller controls the one or more devices to alter the exterior sound level when the determined exterior sound level is not within the sound level limits.

5. The vehicle of claim 4, wherein the one or more devices include at least one of a window and a moonroof.

6. The vehicle of claim 4, wherein the one or more devices include at least one of an audio device and a horn.

7. The vehicle of claim 4, wherein the one or more devices includes a motor of the vehicle or a sound generator for electric vehicles.

8. The vehicle of claim 1, wherein the sound level limit is determined by a sound ordinance.

9. The vehicle of claim 1, wherein the interior microphone is configured to receive voice commands from a driver of the vehicle or is used in an active noise cancellation system.

10. The vehicle of claim 1, wherein the sound transfer function estimates the exterior sound.

11. The vehicle of claim 10, wherein the sound transfer function determines the external sound level based on the detected interior sound and the state of one or more windows or moonroof.

12. A method of monitoring sound of a motor vehicle, the method comprising:
    detecting an interior sound level with an internal microphone located in a cabin interior of the motor vehicle;
    determining an exterior sound outside the cabin interior based on the detected interior sound;
    determining a geographic location of the motor vehicle;
    determining one or more sound limits for the determined geographic location;
    comparing the determined exterior sound with the one or more sound limits; and
    generating an output indicative of the comparison of the exterior sound to the one or more sound limits.

13. The method of claim 12, further comprising the step of notifying an occupant of the vehicle when the exterior sound level is not compliant with the one or more sound limits.

14. The method of claim 12, further comprising the step of controlling one or more devices on the vehicle when the exterior sound level is not compliant to the one or more sound limits to adjust the external sound.

15. The method of claim 14, wherein the one or more devices includes at least one of the vehicle window and moonroof.

16. The method of claim 14, wherein the at least one device includes a horn or audio device on the vehicle.

17. The method of claim 14, wherein the one or more devices includes a motor of the vehicle or artificial sound generator for electric vehicles.

18. The method of claim 12, wherein the one or more sound limits is based on a sound ordinance.

19. The method of claim 12, wherein a sound transfer function estimates the exterior sound.

20. The method of claim 19, wherein the sound transfer function determines the external sound level based on the detected interior sound and the state of one or more windows or moonroof.

* * * * *